(12) United States Patent  (10) Patent No.: US 8,464,958 B2
Cho  (45) Date of Patent: Jun. 18, 2013

(54) UNIFIED IC CARD

(76) Inventor: Jung-Sik Cho, Guri-si (KR)

(*) Notice: Subject to any disclaimer, the term of this patent is extended or adjusted under 35 U.S.C. 154(b) by 0 days.

(21) Appl. No.: 13/514,558

(22) PCT Filed: Nov. 4, 2010

(86) PCT No.: PCT/KR2010/007734
§ 371 (c)(1),
(2), (4) Date: Jun. 7, 2012

(87) PCT Pub. No.: WO2011/071245
PCT Pub. Date: Jun. 16, 2011

(65) Prior Publication Data
US 2012/0248200 A1 Oct. 4, 2012

(30) Foreign Application Priority Data
Dec. 7, 2009 (KR) .................. 10-2009-0120675

(51) Int. Cl.
*G06K 19/06* (2006.01)
(52) U.S. Cl.
USPC .......................................... 235/492; 235/380
(58) Field of Classification Search
USPC .................. 235/474, 380, 379, 437, 486, 475, 235/375, 492
See application file for complete search history.

(56) References Cited

U.S. PATENT DOCUMENTS

| | | | |
|---|---|---|---|
| 6,561,430 B2* | 5/2003 | Ou ................. | 235/487 |
| 6,659,354 B2* | 12/2003 | Everett et al. ........ | 235/492 |
| 6,805,296 B2* | 10/2004 | Sakashita et al. ..... | 235/487 |
| 6,955,293 B1* | 10/2005 | Katsanevas ......... | 235/379 |
| 7,552,467 B2* | 6/2009 | Lindsay ............. | 726/5 |
| 2004/0124246 A1* | 7/2004 | Allen et al. ......... | 235/492 |
| 2009/0159713 A1* | 6/2009 | Mullen et al. ........ | 235/493 |
| 2009/0230197 A1* | 9/2009 | Tanner .............. | 235/492 |
| 2010/0294843 A1* | 11/2010 | Kim ................. | 235/492 |

FOREIGN PATENT DOCUMENTS

| | | | |
|---|---|---|---|
| JP | 2001283173 | | 10/2001 |
| KR | 2002-0045187 | * | 6/2002 |
| KR | 20020045187 | | 6/2002 |

* cited by examiner

*Primary Examiner* — Thien M Le
(74) *Attorney, Agent, or Firm* — IPLA P.A.; James E. Bame

(57) ABSTRACT

A unified IC card includes: a selection part allowing a user to select at least one of a card applet of various card companies, a financial card applet of various financial companies, a stock card applet of various stock companies, a point card applet of various point issuing entities, and an associated card applet of various affiliated companies; an IC chip part electrically connected with the selection part, the IC chip part storing and sharing card information of the card applet, the financial card applet, stock card applet, point card applet, and associated card applet and providing the card information selected by the user to the outside; and a locking part electrically connected with the selection part to control the operation of the selection part.

8 Claims, 5 Drawing Sheets

(a)

(a)

(b)

(a)

(b)

UNIFIED IC CARD

BACKGROUND OF THE INVENTION

1. Field of the Invention

The present invention relates to a unified IC card.

2. Background Art

Recently, conventional MS (Magnetic Stripe) type cards storing at least one data are gradually changed into IC (integrated Circuit) type cards storing various kinds of applications and information on an IC chip having high-degree security functions, but in fact, the IC type cards are not positively vitalized due to the issuing fee more expensive than the MS cards.

Particularly, the current exclusive card issuing method by card companies causes an increase of the card issuing fee.

SUMMARY OF THE INVENTION

Accordingly, the present invention has been made to solve the above-mentioned problems occurring in the prior arts, and it is an object of the present invention to provide a unified IC card, which can provide only selected information of a user's wanted card applet.

To accomplish the above object, according to the present invention, there is provided a unified IC card including: a selection part allowing a user to select at least one of a card applet of various card companies, a financial card applet of various financial companies, a stock card applet of various stock companies, a point card applet of various point issuing entities, and an associated card applet of various affiliated companies; an IC chip part electrically connected with the selection part, the IC chip part storing and sharing card information of the card applet, the financial card applet, stock card applet, point card applet, and associated card applet and providing the card information selected by the user to the outside; and a locking part electrically connected with the selection part to control the operation of the selection part.

The unified IC card according to the present invention allows the user to directly select a wanted card applet.

Moreover, the unified IC card according to the present invention can strengthen security of individual information because it provides only selected information of the user's wanted card applet.

BRIEF DESCRIPTION OF THE DRAWINGS

The above and other objects, features and advantages of the present invention will be apparent from the following detailed description of the preferred embodiment of the invention in conjunction with the accompanying drawings, in which.

DETAILED DESCRIPTION OF THE PREFERRED EMBODIMENT

Figure 1:
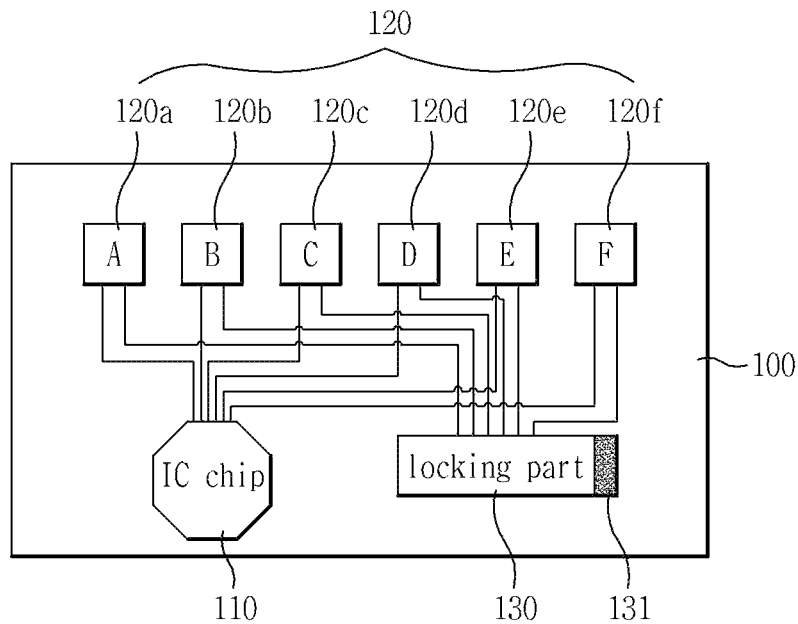
FIG. 1 is a view explaining a unified IC (Integrated Circuit) card according to a first preferred embodiment of the present invention.
Figure 1:
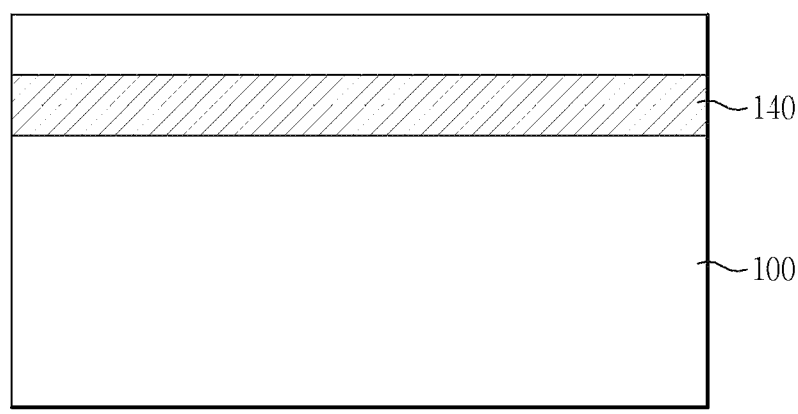

Description will now be made in detail of preferred embodiment of the present invention with reference to the attached drawings. Other detailed matters are contained in the detailed description and drawings. The above and other objects, features and advantages of the present invention will be apparent from the following detailed description of the preferred embodiments of the invention in conjunction with the accompanying drawings. The same reference numerals designate the same parts in the present invention.

Figure 2:
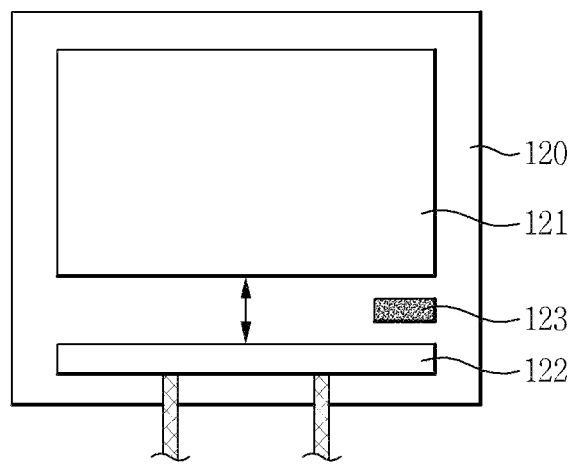
FIG. 2 is a view explaining a selection part of the unified IC card according to the first preferred embodiment of the present invention.

FIG. 1 is a view explaining a unified IC (Integrated Circuit) card according to a first preferred embodiment of the present invention, and FIG. 2 is a view explaining a selection part of the unified IC card according to the first preferred embodiment of the present invention.

Referring to FIGS. 1 and 2, the unified IC card 100 according to a preferred embodiment of the present invention includes a selection part 120, an IC chip part 110, and a locking part 130.

The selection part 120 allows a user to select at least one of a card applet of various card companies, a financial card applet of various financial companies, a stock card applet of various stock companies, a point card applet of various point issuing entities, and an associated card applet of various affiliated companies.

Such a selection part 120 includes a sensing part 121 and a locking control part 122. The sensing part 121 senses pressure applied from the outside. The locking control part 122 is arranged between the sensing part 121 and the locking part 130 to receive a control signal from the locking part 130, which will be described later, and control the selection part 120.

That is, the selection part 120 may include a plurality of selection buttons 120a, 120b, 120c, 120d, 120e, and 120f.

The user can easily select a wanted one of the card applet of various card companies, the financial card applet of various financial companies, the stock card applet of various stock companies, the point card applet of various point issuing entities, and the associated card applet of various affiliated companies through the selection buttons 120a, 120b, 120c, 120d, 120e, and 120f. Furthermore, the user can recognize whether or not the wanted applet was selected while looking at a pressed state of the selection buttons 120a, 120b, 120c, 120d, 120e, and 120f.

Additionally, the user can select a plurality of card applets according to purposes. For instance, if the user wants an associated card and a point card at the same time, the user can select the selection buttons 120a, 120b, 120c, 120d, 120e, and 120f of the selection part 120, in which the associated card applet by various affiliated companies is embedded, and also select the selection buttons 120a, 120b, 120c, 120d, 120e, and 120f of the selection part 120, in which the point card applet by various point issuing companies is embedded. Accordingly, the user can simultaneously use the associated card and the point card.

Moreover, the selection part 120 may further include a selection indicating part 123 for informing the user of the selection, and hence, the user can easily recognize which card applet was selected through the selection indicating part 123 of the selection part 120. Accordingly, the user can more exactly find the selection of the card applet through the selection indicating part 123. The selection indicating part 123 may be a flasher, an LED, or a small-sized display, which is mounted inside the unified IC card 100 and expressed to the outside.

The IC chip part 110 is electrically connected with the selection part 120, stores and shares card information of the card applet, the financial card applet, stock card applet, point card applet, and associated card applet, and provides the card information selected by the user to the outside. The IC chip part 110 is electrically connected with the selection part 120 and can provide only the card information on the user to the outside.

In other words, the IC chip part 110 stores various kinds of company information of the card applet, the financial card applet, the stock card applet, the point card applet, and the associated card applet and the user's individual information on one IC chip, and hence, can provide various functions as if the user uses a lot of cards.

Moreover, the IC chip part 110 can add, delete and change the company information of the card applet, the financial card applet, the stock card applet, the point card applet, and the associated card applet and the user's individual information. Accordingly, the present invention can easily update the company information and the user's individual information. A detailed description of the above will be described later. Furthermore, even though the IC chip part 110 has all of the information of the card applet, the financial card applet, the stock card applet, the point card applet, and the associated card applet, if the user selects the point card applet and the associated card applet, the IC chip part 110 does not provide the card information of the card applet, the financial card applet and the stock card applet to an external terminal (not shown) but provides only the card information of the point card applet and the associated card applet to the external terminal (not shown). Therefore, the user can provide only the user's wanted information to the outside, so that the user can open the minimum information using just one card having various functions.

In this instance, the IC chip part 110 can be electrically connected with a magnetic bar 140 illustrated in FIG. 1(b). Accordingly, the IC chip part 110 can easily provide the card information to the external terminal (not shown) through the magnetic bar 140.

The locking part 130 is electrically connected with the selection part 120 to control the operation of the selection part 120. That is, the locking part 130 can limit the user's access to the IC card by setting up the selection part 120 into a locked mode or an unlocked mode, so that the present invention can prevent any selection against the user's intention and strengthen the user's security more.

Moreover, the locking part 130 may further include a locking indicating part 131 for informing the user of the locked mode and the unlocked mode. As described above, the user can easily recognize whether the selection part 120 is locked or unlocked through the locking indicating part 131, and hence, it can prevent a leakage of the user's personal information in the unlocked mode by someone.

The locking indicating part 131 may be a flasher, an LED, or a small-sized display, which is mounted inside the unified IC card 100 and expressed to the outside.

According to the preferred embodiment of the present invention described till now, the operation of the unified IC card 100 is as follows.

First, the user clicks at least one of the selection buttons 120a, 120b, 120c, 120d, 120e and 120f of the selection part 120 arranged on the unified IC card 100. In other words, the user can click at least one of the selection buttons 120a, 120b, 120c, 120d, 120e and 120f of the selection part 120, in which the card applet, the financial card applet, the stock card applet, the point card applet, and the associated card applet are embedded.

In this instance, when the user clicks the selection part 120, the selection part 120 is converted from a turn-off state into a turn-on state or from a turn-on state into a turn-off state. In other words, when the user clicks selection buttons 120a, 120b, 120c, 120d, 120e and 120f, the selection part 120 which is in the turn-off state is converted into the turn-on state and the selection part 120 which is in the turn-on state is converted into the turn-off state, so that the user can easily select. In this instance, the user can more effectively select the section indicating part 123.

After that, the user clicks the locking part 130 to operate the locking part 130. That is, when the user clicks the locking part 130, the selection part 120 can be converted from the unlocked mode into the locked mode or converted from the locked mode into the unlocked mode.

The user can freely select the selection part 120 when the selection part 120 is in the unlocked mode, but cannot select the selection part 120 even though the user clicks the selection buttons 120a, 120b, 120c, 120d, 120e and 120f of the selection part 120 when the selection part 120 is in the locked mode. In this instance, the user can easily recognize whether the selection part 120 is locked or unlocked through the locking indicating part 131.

As described above, the user can freely select the selection part 120 when the user clicks the locking part 130 to make the selection part 120 in the unlocked mode, and the present invention can prevent any selection against the user's intention when the user clicks the locking part 130 to make the selection part 120 in the locked mode.

In this instance, the unified IC card 100 according to the preferred embodiment, in which the selection part 120 keeps the locked mode by the locking part 130, provides only the selected card information. That is, when the user selects the point card applet and the associated card applet out of the various card applets, the IC card provides only the card information on the point card applet and the associated card applet to the external terminal (not shown) through the magnetic bar 140. Accordingly, the user can provide only wanted individual information to the outside.

Figure 3:
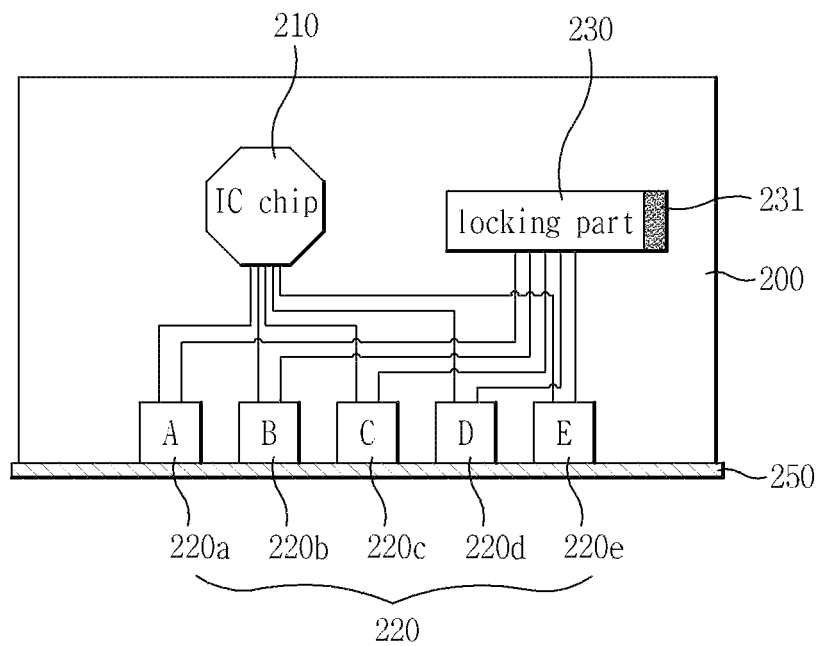
FIG. 3 is a view explaining a unified IC card according to a second preferred embodiment of the present invention.
Figure 3:
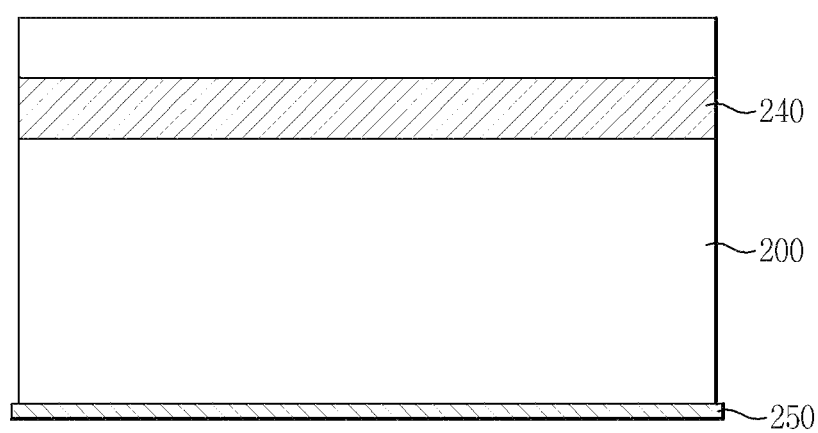
Figure 4:
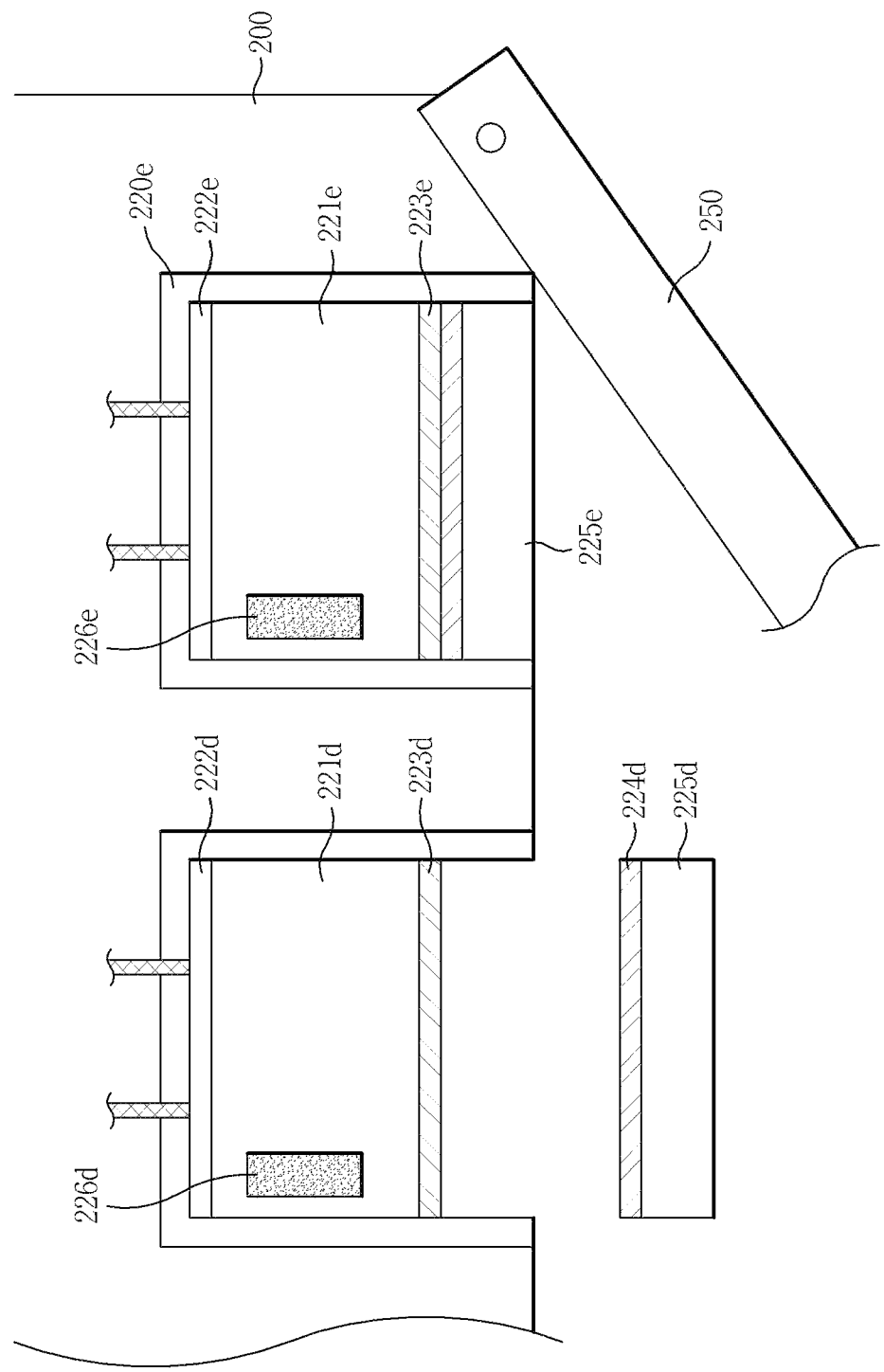
FIG. 4 is a view explaining a selection part of the unified IC card according to the second preferred embodiment of the present invention.

FIG. 3 is a view explaining a unified IC card according to a second preferred embodiment of the present invention, and FIG. 4 is a view explaining a selection part of the unified IC card according to the second preferred embodiment of the present invention.

Referring to FIGS. 3 and 4, the unified IC card 200 according to the second preferred embodiment of the present invention includes a selection part 220, an IC chip part 210, a locking part 230, and a separation preventing part 250. In the second preferred embodiment referring to FIGS. 3 and 4, the parts previously described in the first preferred embodiment referring to FIGS. 1 and 2 and the overlapped parts will be omitted.

The selection part 220 allows a user to select at least one of a card applet of various card companies, a financial card applet of various financial companies, a stock card applet of various stock companies, a point card applet of various point issuing entities, and an associated card applet of various affiliated companies.

The selection part 220 includes sensing parts 221d and 221e, locking control parts 222d and 222e, information storing parts 225d and 225e, and selection indicating parts 226d and 226e. Because the sensing parts 221d and 221e, the locking control parts 222d and 222e, and the selection indicating parts 226d and 226e have the same functions and effects as the sensing part 121, the locking control part 122 and the selection indicating part 123 of the first preferred embodiment, descriptions of the sensing parts 221d and 221e, the locking control parts 222*d* and 222*e*, and the selection indicating parts 226*d* and 226*e* will be omitted.

The information storing parts 225*d* and 225*e* can store card information on the card applet, the financial card applet, the stock card applet, the point card applet, and the associated card applet. That is, the information storing parts 225*d* and 225*e* can store the card information on the card applet, the financial card applet, the stock card applet, the point card applet, and the associated card applet at once or separately store the card information on the card applet, the financial card applet, the stock card applet, the point card applet, and the associated card applet according to capacity. Preferably, the card information on the card applet, the financial card applet, the stock card applet, the point card applet, and the associated card applet are separately stored in different information storing parts 225*d* and 225*e*. Here, the information storing parts 225*d* and 225*e* are not restricted by the capacity, but it is preferable that the size of the information storing parts 225*d* and 225*e* is smaller than the unified IC card 200. Information stored in the information storing parts 225*d* and 225*e* may be stored in the IC chip part 210.

In this instance, the information storing parts 225*d* and 225*e* may be physically or electrically separated from or connected to the selection part 220. That is, when the user physically or electrically separates or connects the information storing parts 225*d* and 225*e* from or to the selection part 220, the user can easily upgrade various kinds of card information and select the card applets of various kinds. In other words, the user can select and connect a necessary card applet to the unified IC card 200, and select and separate an unused card applet from the unified IC card 200. Namely, the information storing parts 225*d* and 225*e* is a storing area different from the IC chip part embedded in the unified IC card and can be detachably mounted on the unified IC card.

The information storing parts 225*d* and 225*e* serve as separate storage media so as to store not only data information, such as an accredited certificate necessary for financial transactions, but also any data information of a file type, for instance, movies, music, text, images, and so on, and to display the data information through other devices, for instance, personal computers.

Moreover, the IC chip part 210 can share all information stored in the information storing parts 225*d* and 225*e*, but the information storing parts 225*d* and 225*e* can limit the sharing of security information stored in the IC chip part. The reason is to prevent leakage of personal information stored in the IC chip part 210.

In this instance, in order to physically or electrically separate or connect the selection part 220 and the information storing parts 225*d* and 225*e*, the selection part 220 includes first connection parts 223*d* and 223*e* physically or electrically connected with the information storing parts 225*d* and 225*e* and the information storing parts 225*d* and 225*e* include second connection parts 224*d* and 224*e* physically or electrically connected with the first connection parts 223*d* and 223*e*. As described above, the selection part 220 and the information storing parts 225*d* and 225*e* can be separated from each other or connected to each other because of the first connection parts 223*d* and 223*e* formed on the selection part 220 and the second connection parts 224*d* and 224*e* formed on the information storing parts 225*d* and 225*e*. The separation preventing part 250 prevents the information storing parts 225*d* and 225*e* from being separated from the selection part 220. That is, the separation preventing part 250 is arranged on the unified IC card 200 in such a way as to surround the information storing parts 225*d* and 225*e* and the selection part 220 to prevent the information storing parts 225*d* and 225*e* connected with the selection part 220 from being separated.

Furthermore, because the separation preventing part 250 surrounds the information storing parts 225*d* and 225*e* and the selection part 220, the selection part 220 and the information storing parts 225*d* and 225*e* can be protected from foreign matters introduced from the outside, and hence, it can prevent malfunction which may occur between the selection part 220 and the information storing parts 225*d* and 225*e*.

The separation preventing part 250 illustrated in FIG. 4 has an end fixed on the unified IC card 200 and the other end being vertically movable and surrounds the information storing parts 225*d* and 225*e* and the selection part 220, but the separation preventing part 250 is not limited to the above, for instance, the separation preventing part 250 is formed in a slide type and surrounds the information storing parts 225*d* and 225*e* and the selection part 220. That is, it is irrelevant to the shape of the separation preventing part 250 if it can surround the information storing parts 225*d* and 225*e* and the selection part 220.

The locking part 230 is electrically connected with the selection part 220 to control the operation of the selection part 220. The locking part 230 may further include a locking indicating part 131 for informing the user of the locked mode and the unlocked mode. The locking indicating part is sufficiently described in the first preferred embodiment, and hence, its description will be omitted.

Figure 5:
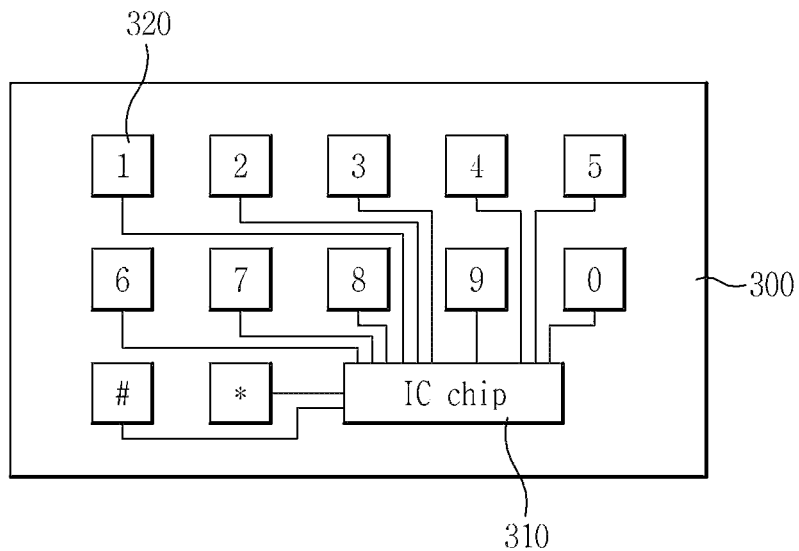
FIG. 5 is a view explaining a unified IC card according to a third preferred embodiment of the present invention.

FIG. 5 is a view explaining a unified IC card according to a third preferred embodiment of the present invention.

In the third preferred embodiment referring to FIG. 5, parts previously described in the first and second preferred embodiment will not be described.

Referring to FIG. 5, the unified IC card 300 according to the third preferred embodiment of the present invention includes a selection part and a locking part, which are integrated with each other. In FIG. 5, the selection part and the locking part are a key pad 320 of an Arabic numeral system, but they are not restricted to the above.

That is, the selection part and the locking part are an integrated keypad 320, which allows the user to use at least two input systems of the Arabic numeral system, a special code system, and a writing system. As described above, because the selection part and the locking part are constructed of one keypad 320, the user can input a serial number on the keypad 320 of the Arabic numeral system, the special code system or the writing system.

As described above, when the user inputs the serial number on the keypad 320 of the Arabic numeral system, the special code system or the writing system, the selection part is converted from the unlocked mode into the locked mode or from the locked mode into the unlocked mode.

Additionally, the user can select at least one of the card applet of various card companies, a financial card applet of various financial companies, the stock card applet of various stock companies, the point card applet of various point issuing entities, and the associated card applet of various affiliated companies through one of the Arabic numeral system, the special code system and the writing system arranged on the key pad 320.

As described above, because the selection part and the locking part is constructed of the keypad 320, on which the Arabic numeral system, the special code system and the writing system are arranged, the user can select various card applets through the keypad 320, on which the Arabic numeral system, the special code system and the writing system are arranged, and limit the selection of various card applets by inputting a serial number.

An IC chip art 310 illustrated in FIG. 5 is previously described in FIGS. 1 to 4, and hence, its detailed description will be omitted.

Figure 6:
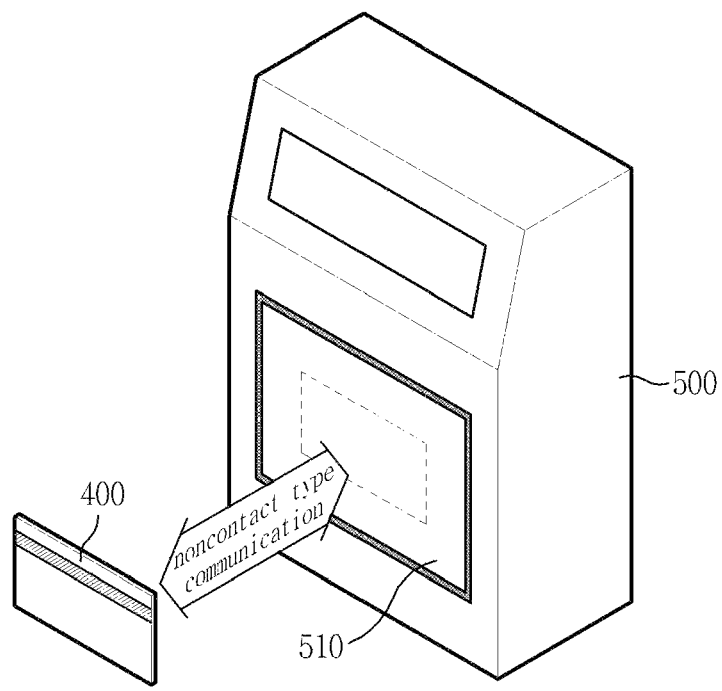
FIG. 6 is a view showing an operation of the unified IC card according to the present invention.

FIG. 6 is a view showing an operation of the unified IC card according to the present invention.

Referring to FIG. 6, the unified IC card 400 according to the present invention is a noncontact type IC card.

The IC chip part embedded in the unified IC card 400 can be autonomously used as a noncontact type card, for instance, a communication type card such as a transportation card. In other words, in order to use the unified IC card 400, the unified IC card 400, in which the IC chip part is embedded, goes close to a card sensor 510 of an external terminal 500.

Therefore, the user can use the IC card in the manner of the communication type card using the magnetic part or the IC chip part. The user can use the unified IC card in various ways at the user's convenience.

Moreover, the unified IC card 400 in which the IC chip part is embedded can add, delete and change the company information of the card applet, the financial card applet, the stock card applet, the point card applet, and the associated card applet and the user's individual information.

Accordingly, the present invention can easily update the company information and the user's individual information.

Furthermore, not shown in the drawings, but the user can input, change or delete information stored in the IC chip part through a separate reader (not shown) and exchange or transfer information through direct (local area) network or Bluetooth with other communication devices, such as cellular phones, electronic machines, or laptop computers.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention. Accordingly, it is to be appreciated that all modifications and equivalents relevant with the present invention belong to the scope of the present invention.

What is claimed is:

1. A unified IC card comprising:
   a selection part allowing a user to select at least one of a card applet of various card companies, a financial card applet of various financial companies, a stock card applet of various stock companies, a point card applet of various point issuing entities, and an associated card applet of various affiliated companies;
   an IC chip part electrically connected with the selection part, the IC chip part storing and sharing card information of the card applet, the financial card applet, stock card applet, point card applet, and associated card applet and providing the card information of the specific applet selected by the user to the outside; and
   a locking part electrically connected with the selection part to control the operation of the selection part,
   wherein the selection part comprises:
   a sensing part embedded in the unified IC card for sensing pressure applied from the outside;
   a locking control part arranged between the sensing part and the locking part to control the selection part by receiving a control signal from the locking part; and
   an information storing part storing card information on the card applet, the financial card applet, the stock card applet, the point card applet, and the associated card applet,
   wherein the information storing part is a storing area different from the IC chip part embedded in the unified IC card and detachably mounted on the unified IC card for limiting sharing of security information stored in the IC chip part.

2. The unified IC card according to claim 1, wherein when the user clicks the selection part, the selection part is converted from a turn-off state into a turn-on state or from a turn-on state into a turn-off state.

3. The unified IC card according to claim 2, wherein when the user clicks the locking part, the selection part is converted from an unlocked mode into a locked mode or from a locked mode into an unlocked mode.

4. The unified IC card according to claim 1, wherein the selection part comprises a first connection part physically or electrically connected with the information storing part and the information storing part comprises a second connection part physically or electrically connected with the first connection part, wherein the first connection part and the second connection part are connected with each other detachably.

5. The unified IC card according to claim 1, wherein the information storing part further comprises a separation preventing part for preventing the selection part from being separated.

6. The unified IC card according to claim 1, wherein the IC chip part adds, deletes and changes company information of the card applet, the financial card applet, the stock card applet, the point card applet, and the associated card applet and the user's individual information in the manner of a communication type card.

7. The unified IC card according to claim 1, wherein the selection part further comprises a selection indicating part to inform the user of the selection.

8. The unified IC card according to claim 1, wherein the locking part further comprises a locking indicating part to inform the user of whether the selection part is in the locked mode or in the unlocked mode.

* * * * *